Nov. 20, 1928.
C. ROOSE ET AL
1,692,188
GAS COCK SAFETY DEVICE
Filed June 20, 1927
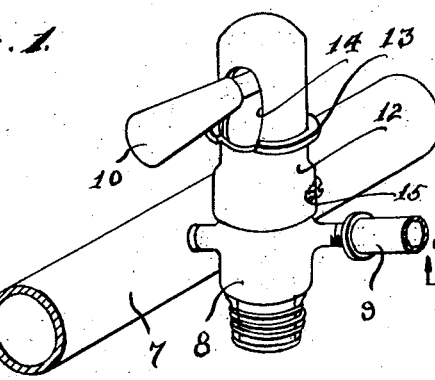
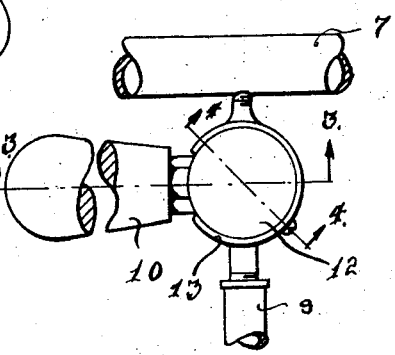
INVENTOR.
CYRIEL ROOSE & JAMES BENZIE
BY
ATTORNEY.

Patented Nov. 20, 1928.

1,692,188

UNITED STATES PATENT OFFICE.

CYRIEL ROOSE, OF ST. CLAIR SHORES, AND JAMES BENZIE, OF DETROIT, MICHIGAN.

GAS-COCK SAFETY DEVICE.

Application filed June 20, 1927. Serial No. 200,060.

Our invention relates to a new and useful improvement in a gas cock safety device adapted for use on gas cocks so as to lock the gas cock in closed position and prevent its being opened in the usual way unless the safety devices is first manipulated.

It is an object of the invention to provide a device whereby accidents caused from undue opening of gas cocks may be eliminated. Another object of the invention is to provide a device of this kind which will be simple in structure, economical of manufacture and highly efficient in use.

Another object of the invention is the provision of a device which is simple in operation and so constructed and arranged as to be adapted for use on gas cocks of various types and sizes.

Other objects will appear hereinafter.

The invention consists in the combination and arrangement of parts hereinafter described and claimed.

The invention will be best understood by a reference to the accompanying drawings which form a part of this specification and in which, Fig. 1 is a perspective view of the invention showing it applied.

Fig. 2 is a top plan view of the invention showing it applied with parts broken away and parts shown in section.

Fig. 3 is a sectional view taken on line 3—3 of Fig. 2.

Fig. 4 is a sectional view taken on line 4—4 of Fig. 2.

Fig. 5 is a sectional view taken on line 5—5 of Fig. 4.

In the drawings I have illustrated a conventional feed pipe 7 which is used on gas stoves and the like, communicating with which is the gas cock 8 having a delivery pipe 9 projected therethrough. The operating handle 10 of the gas cock projects laterally from the plug 11 in the usual manner. It is a common experience where small children are in the house to find the gas cock on the stove open and the gas escaping, this situation often resulting in impairment of health and other more serious consequences.

The invention comprises a cup shaped member 12 having a peripheral flange 13, intermediate its ends, and provided with an opening 14 adjacent its upper end. Adjacent its lower or open end is an arcuate slot 15 through which is extended the screw 16 upon which is threaded the nut 17. The shell 18 of the gas cock is usually cut away as at 19 and the plug provided with a pin 20 to limit the opening and closing movements of the plug.

In applying the invention the handle 10 is removed and the cup shaped member 12 positioned over the upper end of the plug 11 and the handle then projected through the opening 14 and secured to the plug 11 in the usual manner. The cup shaped member will then seat downwardly over the shell 18 sufficiently to cause the nut 17 to engage in the recess 19, thus preventing an opening of the gas cock. Therefore in order to open the gas cock it is but necessary to, by gripping the peripheral flange 13, raise the cup shaped member upwardly sufficiently to disengage the nut 17 from the recess 19. To permit this axial movement of the cup shaped member on the gas cock plug the opening 14 is provided as shown in Fig. 1.

In order to provide a device which may be used on gas cocks of different types it is necessary to take into consideration variations in sizes and form, and for this purpose the opening 14 has been made sufficiently large to accommodate the different sizes and types of handles 10. The position of the recess 19 relatively to the direction of extension of the handle 10 must also be taken into account as the location of this recess varies on different gas cocks, and to this end we have provided the arcuate slot 15 so that the screw 16 may be adjusted to different circumferential positions on the cup shaped member 12.

While we have illustrated and described the preferred form of our invention, we do not wish to limit ourselves to the precise retails of structure shown, but desire to avail ourselves of such variations and modifications as come within the scope of the appended claims.

Having thus described our invention what we claim as new and desire to secure by Letters Patent is:

1. A gas cock saftey device of the class described adapted for use with a gas cock having a shell provided with a recess in its upper edge, a plug rotatably mounted in said shell, and a handle projecting laterally from said plug, comprising: a cup shaped member adapted for seating over said plug and the upper end of said shell and provided with an enlarged opening for accommodating said handle; means carried by said cup shaped member adapted upon axial movement of said cup shaped member relatively to said shell in one direction for engaging in said recess, and upon axial movement in the opposite direction for disengaging from said recess, said plug being non-rotatable relatively to said shell upon engagement of said means in said recess; and means for adjusting the circumferential position of said engagement means relatively to said cup shaped member.

2. A gas cock safety device of the class described comprising: a cup shaped member having an enlarged opening formed in one side adjacent its upper end and provided with a circumferential slot adjacent its open end; a screw projected through said slot; and a nut threaded on said screw and positioned interiorly of said cup shaped member.

In testimony whereof we have signed the foregoing specification.

CYRIEL ROOSE.
JAMES BENZIE.